US009288269B2

(12) United States Patent
Ispas et al.

(10) Patent No.: US 9,288,269 B2
(45) Date of Patent: Mar. 15, 2016

(54) NETWORK PRESENCE OFFLOAD

(71) Applicant: Marvell World Trade Ltd., St. Michael (BB)

(72) Inventors: Iulian Andrei Ispas, Weingarten-Baden (DE); Jens Wilke, Ettlingen (DE)

(73) Assignee: MARVELL WORLD TRADE LTD., St. Michael (BB)

( * ) Notice: Subject to any disclaimer, the term of this patent is extended or adjusted under 35 U.S.C. 154(b) by 152 days.

(21) Appl. No.: 13/905,335

(22) Filed: May 30, 2013

(65) Prior Publication Data
US 2013/0325995 A1    Dec. 5, 2013

(51) Int. Cl.
*G06F 15/173* (2006.01)
*H04L 29/08* (2006.01)

(52) U.S. Cl.
CPC ............ *H04L 67/125* (2013.01); *H04L 67/025* (2013.01); *H04L 67/24* (2013.01)

(58) Field of Classification Search
CPC ...... H04L 67/125; H04L 67/24; H04L 67/025
USPC ......................................... 709/224, 223, 217
See application file for complete search history.

(56) References Cited

U.S. PATENT DOCUMENTS

| 7,912,989 | B2 * | 3/2011 | Tsunashima et al. ......... 709/253 |
| 8,068,433 | B2 * | 11/2011 | Hodges ................. G06F 1/3209 370/216 |
| 8,924,586 | B2 * | 12/2014 | Hikichi ......................... 709/238 |
| 2010/0332212 | A1 * | 12/2010 | Finkelman ...................... 703/23 |
| 2012/0117401 | A1 | 5/2012 | Gobriel et al. |
| 2012/0155348 | A1 * | 6/2012 | Jacobson ....................... 370/311 |
| 2013/0067260 | A1 * | 3/2013 | Gatta et al. .................... 713/323 |
| 2013/0110521 | A1 * | 5/2013 | Hwang et al. .................. 704/500 |
| 2013/0203345 | A1 * | 8/2013 | Fisher .......................... 455/41.1 |
| 2013/0210493 | A1 * | 8/2013 | Tal et al. ....................... 455/566 |
| 2013/0237254 | A1 * | 9/2013 | Papakipos et al. ......... 455/456.3 |
| 2013/0268655 | A1 * | 10/2013 | Luna et al. ................... 709/224 |
| 2013/0316746 | A1 * | 11/2013 | Miller et al. .................. 455/466 |
| 2014/0113561 | A1 * | 4/2014 | Maguire ...................... 455/41.2 |

OTHER PUBLICATIONS

Notification of Transmittal of The International Search Report and The Written Opinion of The International Searching Authority, or The Declaration dated Sep. 30, 2013 in reference to PCT/IB2013/054485 (7 pgs).

* cited by examiner

*Primary Examiner* — Karen Tang

(57) ABSTRACT

Devices having corresponding methods and computer-readable media comprise: a host processor, wherein the host processor is configured to execute a host client while the device is in an awake mode, and wherein the host client maintains a network connection while executing; and a network interface controller comprising an embedded processor, wherein the embedded processor is configured to execute an embedded client while the device is in a sleep mode, wherein the embedded client is configured to maintain the network connection while executing.

13 Claims, 3 Drawing Sheets

NETWORK PRESENCE OFFLOAD

CROSS-REFERENCE TO RELATED APPLICATIONS

This disclosure claims the benefit of U.S. Provisional Patent Application Ser. No. 61/653,237, filed on May 30, 2012, entitled "APPLICATION SERVICE OFFLOAD FUNCTIONALITY," and U.S. Provisional Patent Application Ser. No. 61/653,250, filed on May 30, 2012, entitled "SOCIAL MEDIA PRESENCE OFFLOAD FOR MEDIA DEVICES," the disclosures thereof incorporated by reference herein in their entirety.

FIELD

The present disclosure relates to the field of network communications.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Current network devices are frequently used to connect to application servers such as social media servers. Current social media servers include video call servers, social networking servers, and the like. A network device may execute a social media application that uses multiple network connections, including a control connection with the social media server, as well as a dynamically-changing number of data connections for transferring large amounts of data or data streams. The data connections may also be used to establish direct connections to other members.

To assure that important events can be delivered at anytime, current network devices must be powered-up all the time in order to maintain the control connection. These events may include incoming calls, requests from other members of a social media service, and the like. Due to this "always on" use model, such devices consume a significant amount of power.

SUMMARY

In general, in one aspect, an embodiment features a device comprising: a host processor, wherein the host processor is configured to execute a host client while the device is in an awake mode, and wherein the host client maintains a network connection while executing; and a network interface controller comprising an embedded processor, wherein the embedded processor is configured to execute an embedded client while the device is in a sleep mode, wherein the embedded client is configured to maintain the network connection while executing.

Embodiments of the apparatus can include one or more of the following features. In some embodiments, the embedded client is further configured to cause the device to transition from the sleep mode to the awake mode responsive to receiving, over the network connection, an indication of a wake event corresponding to one or more wake criteria. In some embodiments, the wake criteria include: receiving a message; receiving a connection request; receiving a request from one or more selected persons; receiving a call request; receiving a predetermined protocol message; and receiving a request from one or more selected services. In some embodiments, to maintain the network connection, the embedded client is further configured to perform at least one of: sending keep alive messages; authentication; re-authentication; encryption key exchange; exchanging adjacent neighbor information; accepting maintenance updates; and performing file transfers. In some embodiments, the host client is further configured to offload the network connection and the wake criteria to the embedded client responsive to the device transitioning from the awake mode to the sleep mode. In some embodiments, the embedded client is further configured to offload the network connection and the wake criteria to the host client responsive to the device transitioning from the sleep mode to the awake mode. In some embodiments, the host client comprises: a social media client. Some embodiments comprise a social media device comprising the device.

In general, in one aspect, an embodiment features a method for a device, wherein the method comprises: executing a host client on a host processor of the device while the device is in an awake mode, wherein the host client maintains a network connection while executing; and executing an embedded client on an embedded processor of a network interface controller of the device while the device is in a sleep mode, wherein the embedded client is configured to maintain the network connection while executing.

Embodiments of the method can include one or more of the following features. In some embodiments, the embedded client causes the device to transition from the sleep mode to the awake mode responsive to receiving, over the network connection, an indication of a wake event corresponding to one or more wake criteria. In some embodiments, the wake criteria include at least one of: receiving a message; receiving a connection request; receiving a request from one or more selected persons; receiving a call request; receiving a predetermined protocol message; and receiving a request from one or more selected services. In some embodiments, the host client offloads the network connection and the wake criteria to the embedded client responsive to the device transitioning from the awake mode to the sleep mode. In some embodiments, the embedded client offloads the network connection and the wake criteria to the host client responsive to the device transitioning from the sleep mode to the awake mode. In some embodiments, the host client comprises: a social media client.

In general, in one aspect, an embodiment features computer-readable media embodying instructions executable by a device to perform functions comprising: executing a host client on a host processor of the device while the device is in an awake mode, wherein the host client maintains a network connection while executing; and executing an embedded client on an embedded processor of a network interface controller of the device while the device is in a sleep mode, wherein the embedded client is configured to maintain the network connection while executing.

Embodiments of the computer-readable media can include one or more of the following features. In some embodiments, the embedded client causes the device to transition from the sleep mode to the awake mode responsive to receiving, over the network connection, an indication of a wake event corresponding to one or more wake criteria. In some embodiments, the wake criteria include at least one of receiving a message; receiving a connection request; receiving a request from one or more selected persons; receiving a call request; receiving a predetermined protocol message; and receiving a request from one or more selected services. In some embodiments, the host client offloads the network connection and the wake criteria to the embedded client responsive to the device transitioning from the awake mode to the sleep mode. In some embodiments, the embedded client offloads the network connection and the wake criteria to the host client responsive to the device transitioning from the sleep mode to the awake mode. In some embodiments, the host client comprises: a social media client.

The details of one or more implementations are set forth in the accompanying drawings and the description below. Other features will be apparent from the description and drawings, and from the claims.

Figure 1:
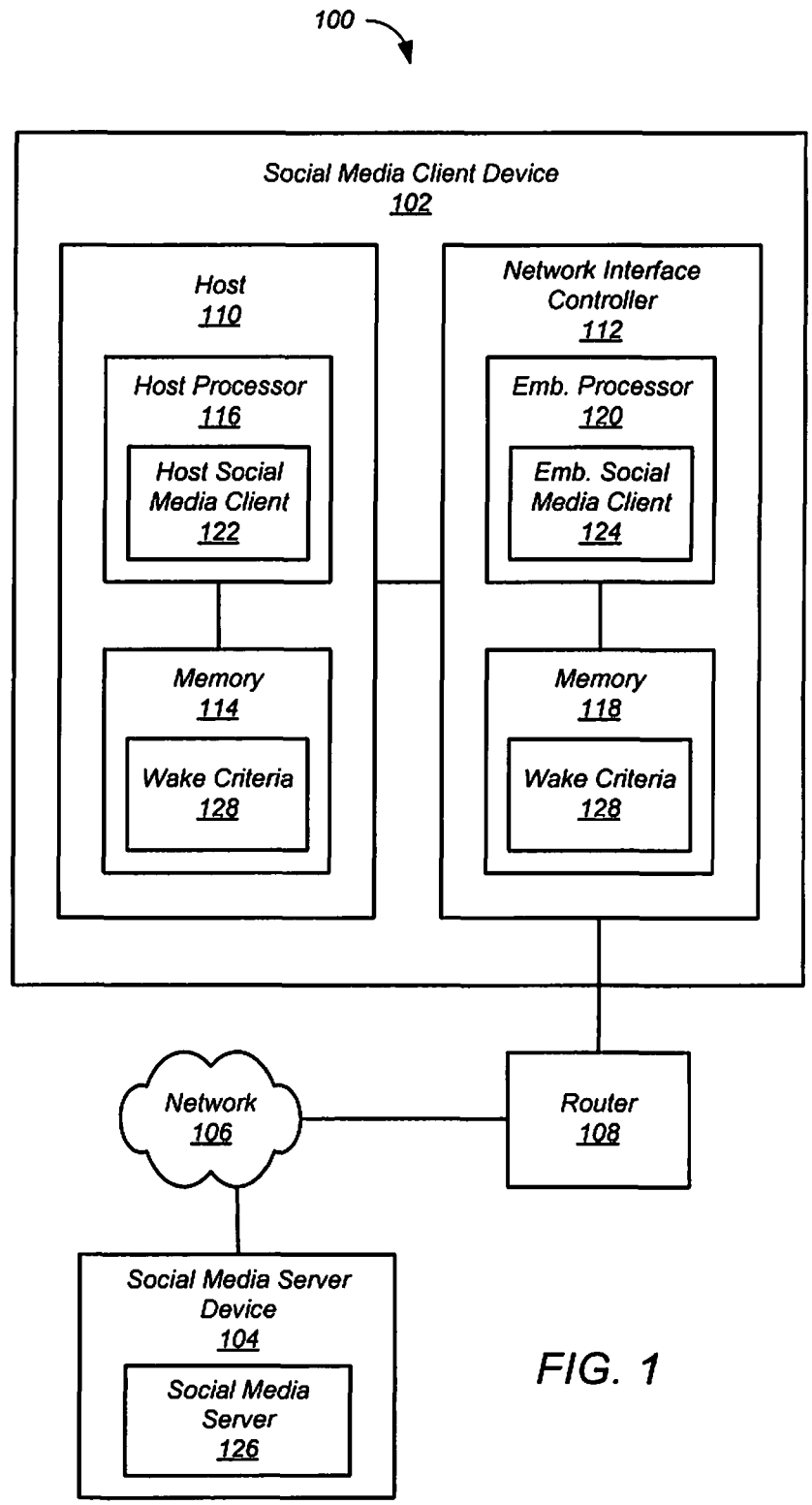
FIG. 1 shows elements of a social media system according to one embodiment.

The leading digit(s) of each reference numeral used in this specification indicates the number of the drawing in which the reference numeral first appears.

DETAILED DESCRIPTION

Embodiments of the present disclosure provide network presence offload. As used herein, the term "network presence" relates to maintaining a network connection such that important events are received, and the network device appears to be present to other devices connected to the network, and the term "social media presence" refers to maintaining network presence for a social media service. As used herein, "network connection" refers generally to the connection between two network-enabled devices, and is not intended to be limited to any particular network layer such as those in an OSI-layered network. In the described embodiments, the network presence maintained by a host processor of a network device may be offloaded to an embedded processor of a network interface controller, thereby allowing the network device to enter a low-power sleep mode, for example by powering down. During the sleep mode, the embedded processor maintains the network presence. When the network device returns to a full-power awake mode, the embedded processor offloads the network presence to the host processor. Because the network connection is maintained from the client side, the described embodiments work well in firewall or network address translation (NAT) environments, and even over the Internet where server-driven "push" methods like Wake-on-LAN (WOL) fail.

FIG. 1 shows elements of a social media system 100 according to one embodiment. Although in the described embodiment elements of the social media system 100 are presented in one arrangement, other embodiments may feature other arrangements. For example, elements of the social media system 100 can be implemented in hardware, software, or combinations thereof. But while the described embodiments employ social media clients and servers, other embodiments may employ any type of clients and servers.

Referring to FIG. 1, the social media system 100 includes a social media client device 102, a social media server device 104, and a network 106 and a router 108 connecting the social media client device 102 with the social media server device 104. The social media client device 102 can be implemented as any sort of network-enabled device, such as a personal computer, laptop computer, notebook computer, tablet computer, smartphone, television set, radio set, network-attached storage (NAS), networked printer, and the like. The social media server device 104 can be implemented as a server computer or the like. The network 106 can be implemented as a wide-area network such as the Internet, a local-area network (LAN), or the like. The connection between the social media client device 102 and the router 108 can be any sort of connection, including wired, wireless, optical, or the like. The social media client device 102 includes a host 110 and a network interface controller 112. The host 110 includes a memory 114 and a host processor 116. The network interface controller 112 includes a memory 118 and an embedded processor 120.

The social media client device 102 has an awake mode and a sleep mode. In the sleep mode, the social media client device 102 reduces its power consumption, for example by placing the host processor 116 in a low-power mode. The host processor 116 executes a host social media client 122 while the social media client device 102 is in the awake mode. The host social media client 122 provides social media services in conjunction with a social media server 126 executing on the social media server device 104. The social media services can include video calling services, social networking services, media sharing services, and the like. Non-social-media services can include email services, management services, cloud printing services, other cloud services, and the like.

The embedded processor 120 in the network interface controller 112 executes an embedded social media client 124. The embedded social media client 124 can execute in either an active mode or a passive mode. While the social media client device 102 is in the sleep mode, the embedded social media client 124 executes in the active mode. In the active mode, the embedded social media client 124 maintains the network presence of the social media service. That is, the embedded social media client 124 maintains a network connection with the social media server device 104 such that, to the social media server device 104, the social media client device 102 appears to be present. For social media services involving a control connection and one or more data connections, the embedded social media client 124 maintains at least the control connection.

While executing in the active mode, the embedded social media client 124 can wake the social media client device 102. That is, the embedded social media client 124 can cause the social media client device 102 to transition from the sleep mode to the awake mode. The embedded social media client 124 can wake the social media client device 102 responsive to receiving, over the network connection, an indication of a wake event corresponding to one or more wake criteria 128. The wake events can include, for example, receiving a connection request, receiving a request from a selected person, receiving a request from a selected social media service, and the like. The wake criteria 128 can be stored in memories 114, 118. While the host social media client 122 is in the awake mode, the embedded social media client 124 executes in a passive mode. In the passive mode, the host social media client 122 communicates with the embedded social media client 124 to determine when the host social media client 122 next transitions to the sleep mode.

Figure 2:
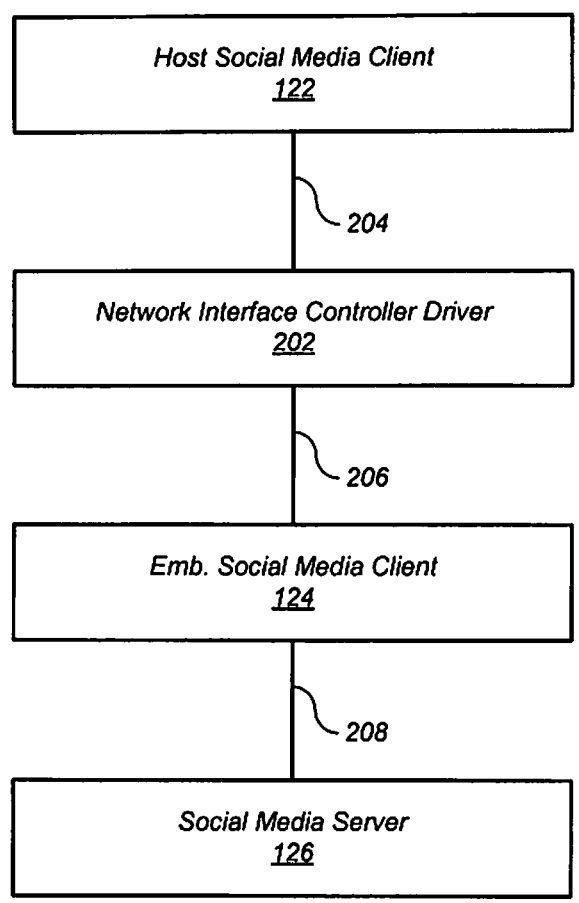
FIG. 2 shows raw communication interfaces for the host social media client, the embedded social media client, and the social media server of FIG. 1.

FIG. 2 shows raw communication interfaces for the host social media client 122, the embedded social media client 124, and the social media server 126 of FIG. 1. Referring to FIG. 2, the host social media client 122 communicates with embedded social media client 124 through a network interface controller driver 202 and two raw internal interfaces 204 and 206. That is, the host social media client 122 communicates with the network interface controller driver 202 through the raw internal interface 204, and the network interface controller driver 202 communicates with the embedded social media client 124 through the raw internal interface 206. The embedded social media client 124 communicates with the social media server 126 over a raw external interface 208. The raw interfaces 204, 206, 208 can pass raw packets, and can provide raw sockets and the like. The raw interface 204 between the host social media client 122 and the network interface controller driver 202 can be implemented as a register interface in a shared memory or the like. In some embodiments, the communications over the raw internal interfaces 204, 206 can be encrypted to protect the exchange of sensitive information such as security keys, logon information, and the like. The use of raw interfaces allow the use of developer kits to allow the developer of a host social media client 122 to create a custom embedded social media client 124.

Figure 3:
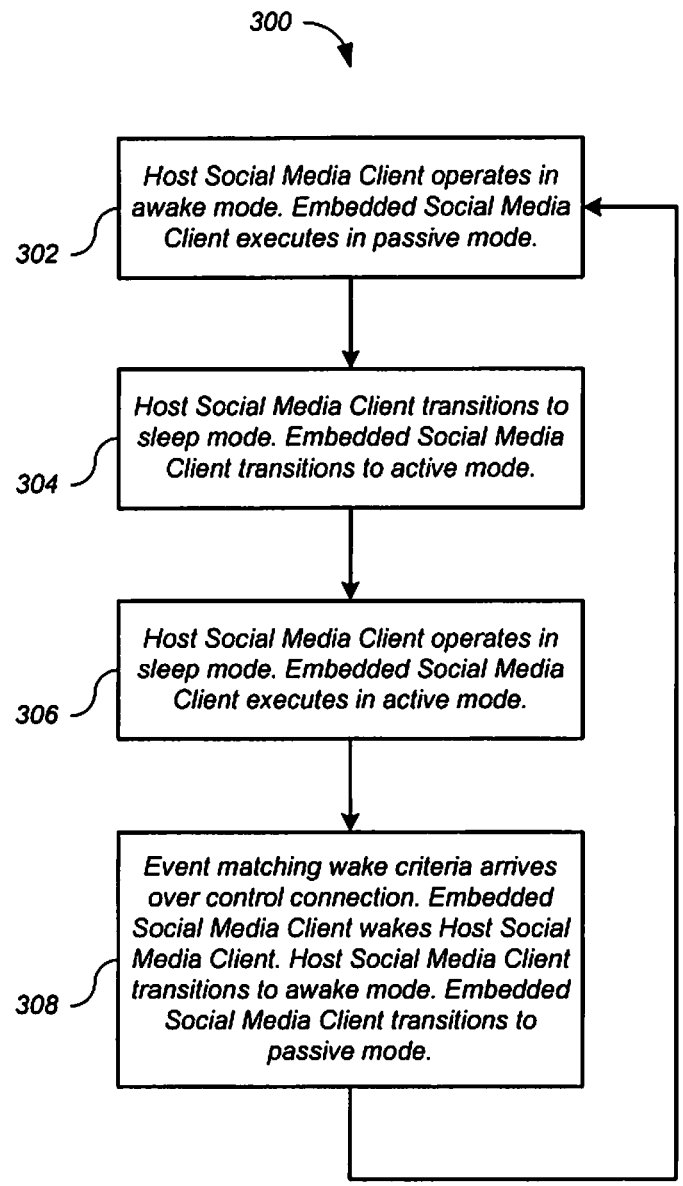
FIG. 3 shows a process for the social media system of FIG. 1 according to one embodiment.

FIG. 3 shows a process 300 for the social media system 100 of FIG. 1 according to one embodiment. Although in the described embodiments the elements of process 300 are presented in one arrangement, other embodiments may feature other arrangements. For example, in various embodiments, some or all of the elements of process 300 can be executed in a different order, concurrently, and the like. Also some elements of process 300 may not be performed, and may not be executed immediately after each other. In addition, some or all of the elements of process 300 can be performed automatically, that is, without human intervention.

Referring to FIG. 3, at 302, the social media client device 102 operates in the awake mode. The social media client device 102 maintains network presence while the social media client device 102 is in the awake mode. That is, the social media client device 102 maintains the control connection with the social media server device 104. In addition, the social media client device 102 maintains any data connections required by the social media service while the social media client device 102 is in the awake mode. While the social media client device 102 is in the awake mode, the embedded social media client 124 executes in a passive mode. In the passive mode, the embedded social media client 124 can communicate with the host social media client 122 over the raw internal interfaces 204, 206, for example to inform the host social media client 122 of the capabilities of the embedded social media client 124, and to respond to handover requests from the host social media client 122. The capability information can include handover capability, amount of available storage, available actions, and the like. The communication method can include advertising, polling, publishing, and the like.

At 304, the social media client device 102 transitions from the awake mode to the sleep mode, and embedded social media client 124 transitions from the passive mode to the active mode. The transition can be prompted by any criteria. For example the social media client device 102 can transition from the awake mode to the sleep mode after a predetermined interval of social media service inactivity. As part of the transition from the awake mode to the sleep mode, the social media client device 102 offloads the network connection, and the wake criteria 128, to the embedded social media client 124 in the network interface controller 112. The wake criteria 128 is stored in the memory 118 in the network interface controller 112. In some embodiments, the social media client device 102 can offload the network connection, and the wake criteria 128, to the embedded social media client 124 responsive to a crash in the host social media client 122. In some embodiments, the embedded social media client 124 can provide information describing the type of offload (for example, whether normal or forced by a crash), and can have black box functions to provide pre-crash information for diagnosing the cause of the crash.

In some embodiments, as part of the transition to the sleep mode, the host social media client 122 also passes one or more of the following parameters to the embedded social media client 124: the specific IP address or the full qualified domain name (FQDN, for example server.provider.com) of a social media server or other (IMAP) server, and the TCP port number if not a standard port; the username and password for the social media server 126; a configuration set to specify the supported services if needed (that is, the runtime configuration); and the like.

At 306, the social media client device 102 operates in the sleep mode, and the embedded social media client 124 executes in the active mode. In the sleep mode, the host social media client 122 can communicate with the embedded social media client 124 over the raw internal interfaces 204, 206, for example to respond to wake requests from the embedded social media client 124. When executing in the active mode, the embedded social media client 124 maintains social media presence. That is, the embedded social media client 124 maintains the control connection with the social media server device 104. Maintaining the control connection can include sending keep alive messages, authentication, re-authentication, encryption key exchange, exchanging adjacent neighbor information, accepting maintenance updates, performing file transfers, and the like.

When executing in the active mode, the embedded social media client 124 also compares events arriving over the control connection with the wake criteria 128 stored in the memory 118. The wake criteria can include receiving events over the control connection such as a message, a connection request, a request from one or more selected persons, a call request, a predetermined protocol message, a request from one or more selected services, and the like. The wake criteria 128 can be predefined, defined or updated during operation, or any combination thereof. In some embodiments, the events may be encrypted. In some embodiments, the events may require logon information or the like. In such embodiments, the host social media client 122 can transfer cryptographic keys, logon information, and the like to the embedded social media client 124, for example while the host social media client 122 is transitioning from the awake mode to the sleep mode.

At 308, responsive to an event arriving over the control connection matching the wake criteria 128 stored in the memory 118, the host social media client 122 wakes the social media client device 102. In response, the social media client device 102 transitions from the sleep mode to the awake mode. As part of the transition from the sleep mode to the awake mode, the embedded social media client 124 offloads the network connection, and the wake criteria 128, to the host social media client 122 in the host 110. The wake criteria 128 is stored in the memory 114 in the host 110. The embedded social media client 124 transitions from the active mode to the passive mode. Then, at 302, the social media client device 102 is again in the awake mode, and the embedded social media client 124 in the passive mode.

In some embodiments, as part of the transition to the awake mode, the embedded social media client 124 also passes the following parameters to the host social media client 122: the identity of the wake event (for example, the ID of an email matching wake criteria 128), which can be used to determine a reaction to the wake event; statistics to give users an overview of how much power was saved (for example, a count of how many unneeded wakeups were avoided); and the like.

In addition to the use cases described above, many other use cases are possible. In some embodiments, a user can remotely log into a home security system to query live camera streams, voice or video logs, and the like. In some embodiments, a user can update off-site video or voice messages of a home automation system. Some embodiments can wake a media device when specific incoming text, voice or video messages arrive. Instead of waking the media device, some embodiments give an acoustic alarm, optical alarm, or the like.

Various embodiments of the present disclosure can be implemented in digital electronic circuitry, or in computer hardware, firmware, software, or in combinations thereof. Embodiments of the present disclosure can be implemented in a computer program product tangibly embodied in a computer-readable storage device for execution by a programmable processor. The described processes can be performed by a programmable processor executing a program of instructions to perform functions by operating on input data and generating output. Embodiments of the present disclosure can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, processors receive instructions and data from a read-only memory and/or a random access memory. Generally, a computer includes one or more mass storage devices for storing data files. Such devices include magnetic disks, such as internal hard disks and removable disks, magneto-optical disks; optical disks, and solid-state disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits). As used herein, the term "module" may refer to any of the above implementations.

A number of implementations have been described. Nevertheless, various modifications may be made without departing from the scope of the disclosure. Accordingly, other implementations are within the scope of the following claims.

What is claimed is:

1. A social media client device configured to operate in a social media system, the social media client device comprising:
   a host processor located on the social media client device, wherein the host processor is configured to execute a host social media client while the device is in an awake mode, wherein the host social media client maintains a network connection with a social media server for the social media client device while executing the host social media client, wherein the host social media client executed by the host processor provides social media services to a user of the social media client device, and wherein the host processor is configured to store, in a first memory, wake criteria indicative of events that cause the social media client device to transition from a sleep mode to the awake mode; and
   a network interface controller comprising an embedded processor, separate from the host processor and located on the same social media client device as the host processor, wherein the embedded processor is configured to i) execute an embedded social media client while the social media client device is in the sleep mode, wherein the embedded social media client is configured to maintain the network connection for the social media client device while executing the embedded social media client, ii) store, in a second memory separate from the first memory, the wake criteria in response to the social media client device transitioning from the awake mode to the sleep mode, and iii) transition the social media client device from the sleep mode to the awake mode in response to a comparison between an event received via the network connection and the wake criteria.

2. The social media client device of claim 1, wherein the wake criteria include:
   receiving a message;
   receiving a connection request;
   receiving a request from one or more selected persons;
   receiving a call request;
   receiving a predetermined protocol message; and
   receiving a request from one or more selected services.

3. The social media client device of claim 1, wherein, to maintain the network connection, the embedded social media client is further configured to perform at least one of:
   sending keep alive messages;
   authentication;
   re-authentication;
   encryption key exchange;
   exchanging adjacent neighbor information;
   accepting maintenance updates; and
   performing file transfers.

4. The social media client device of claim 1, wherein:
   the host social media client is further configured to offload the network connection and the wake criteria to the embedded client responsive to the device transitioning from the awake mode to the sleep mode.

5. The social media client device of claim 1, wherein:
   the embedded social media client is further configured to offload the network connection and the wake criteria to the host social media client responsive to the social media client device transitioning from the sleep mode to the awake mode.

6. A method for operating a social media client device in a social media system, wherein the method comprises:
   executing a host social media client on a host processor located on the social media client device while the social media client device is in an awake mode, wherein the host social media client maintains a network connection with a social media server for the social media client device while executing the host social media client, wherein the host social media client executed by the host processor provides social media services to a user of the social media client device;
   storing, in a first memory, wake criteria indicative of events that cause the social media client device to transition from a sleep mode to the awake mode
   executing an embedded social media client on an embedded processor of a network interface controller, the embedded processor separate from the host processor and located on the same social media client device as the host processor, while the social media client device is in a sleep mode, wherein the embedded social media client is configured to maintain the network connection for the social media client device while executing the embedded social media client;

storing, in the network interface controller in a second memory separate from the first memory, the wake criteria in response to the social media client device transitioning from the awake mode to the sleep mode; and transitioning the social media client device from the sleep mode to the awake mode in response to a comparison between an event received via the network connection and the wake criteria.

7. The method of claim 6, wherein the wake criteria include at least one of:
receiving a message;
receiving a connection request;
receiving a request from one or more selected persons;
receiving a call request;
receiving a predetermined protocol message; and
receiving a request from one or more selected services.

8. The method of claim 6, wherein:
the host social media client offloads the network connection and the wake criteria to the embedded social media client responsive to the social media client device transitioning from the awake mode to the sleep mode.

9. The method of claim 6, wherein:
the embedded social media client offloads the network connection and the wake criteria to the host social media client responsive to the social media client device transitioning from the sleep mode to the awake mode.

10. Non-transitory computer-readable media embodying instructions executable by a social media client device to perform functions comprising:
executing a host social media client on a host processor located on the social media client device while the social media client device is in an awake mode, wherein the host social media client maintains a network connection with a social media server for the social media client device while executing the host social media client, wherein the host social media client executed by the host processor provides social media services to a user of the social media client device;

storing, in a first memory, wake criteria indicative of events that cause the social media client device to transition from a sleep mode to the awake mode executing an embedded social media client on an embedded processor of a network interface controller, the embedded processor separate from the host processor and located on the same social media client device as the host processor, while the social media client device is in a sleep mode, wherein the embedded social media client is configured to maintain the network connection for the social media client device while executing the embedded social media client;

storing, in the network interface controller in a second memory separate from the first memory, the wake criteria in response to the social media client device transitioning from the awake mode to the sleep mode; and transitioning the social media client device from the sleep mode to the awake mode in response to a comparison between an event received via the network connection and the wake criteria.

11. The computer-readable media of claim 10, wherein the wake criteria include at least one of:
receiving a message;
receiving a connection request;
receiving a request from one or more selected persons;
receiving a call request;
receiving a predetermined protocol message; and
receiving a request from one or more selected services.

12. The computer-readable media of claim 10, wherein:
the host social media client offloads the network connection and the wake criteria to the embedded social media client responsive to the social media client device transitioning from the awake mode to the sleep mode.

13. The computer-readable media of claim 10, wherein:
the embedded social media client offloads the network connection and the wake criteria to the host social media client responsive to the social media client device transitioning from the sleep mode to the awake mode.

* * * * *